United States Patent [19]

Godbout

[11] Patent Number: 4,530,289
[45] Date of Patent: Jul. 23, 1985

[54] SOLID FUEL FURNACE

[75] Inventor: Normand Godbout, Sherbrooke, Canada

[73] Assignee: Universite de Sherbrooke, Sherbrooke, Canada

[21] Appl. No.: 642,735

[22] Filed: Aug. 20, 1984

Related U.S. Application Data

[63] Continuation of Ser. No. 449,644, Dec. 14, 1982, abandoned.

[51] Int. Cl.³ .............................................. F23K 3/16
[52] U.S. Cl. .................................... 110/117; 110/108; 110/118; 110/234; 110/254; 110/293; 126/68; 126/165
[58] Field of Search ............... 110/108, 116, 117, 234, 110/248, 254, 267, 293, 294, 322, 101 R, 102, 118; 126/68, 73, 77, 153, 152 B, 165

[56] References Cited

U.S. PATENT DOCUMENTS

| Re. 23,319 | 1/1951 | Sanford | 110/293 |
|---|---|---|---|
| 1,335,265 | 3/1920 | Zamernik | 110/117 |
| 1,500,348 | 7/1924 | Tackabery | 110/293 |
| 1,800,105 | 4/1931 | Rainchon | 110/293 |
| 2,382,785 | 8/1945 | Franklin | 110/293 |
| 2,454,400 | 11/1948 | Norman | 110/289 |
| 2,773,629 | 12/1956 | Miller | 222/226 |
| 3,830,218 | 8/1974 | Shelton | 126/165 |
| 4,102,279 | 7/1978 | Groschl et al. | 110/234 |
| 4,321,879 | 3/1982 | Toivo | 110/267 |
| 4,339,998 | 7/1982 | Finch | 110/117 |
| 4,341,198 | 7/1982 | Sullivan | 126/68 |

FOREIGN PATENT DOCUMENTS 2072831 10/1981 United Kingdom ............... 110/267

Primary Examiner—Henry C. Yuen
Assistant Examiner—Steven E. Warner
Attorney, Agent, or Firm—Cushman, Darby & Cushman

[57] ABSTRACT

The disclosure herein describes a furnace for consuming solid fuel, such as wood, which comprises a gravitational feed chute for feeding the solid fuel in a combustion chamber; the chute has an open lower feed end adjoining the combustion chamber, the feed end being equipped with a plurality of flexible spaced retaining elements which serve to support the load of solid fuel in the chute; air nozzles are provided in the combustion chamber facing the feed end of the chute to create a circulation forcing combustion gases to pass through a zone of high temperature in the combustion chamber.

13 Claims, 7 Drawing Figures

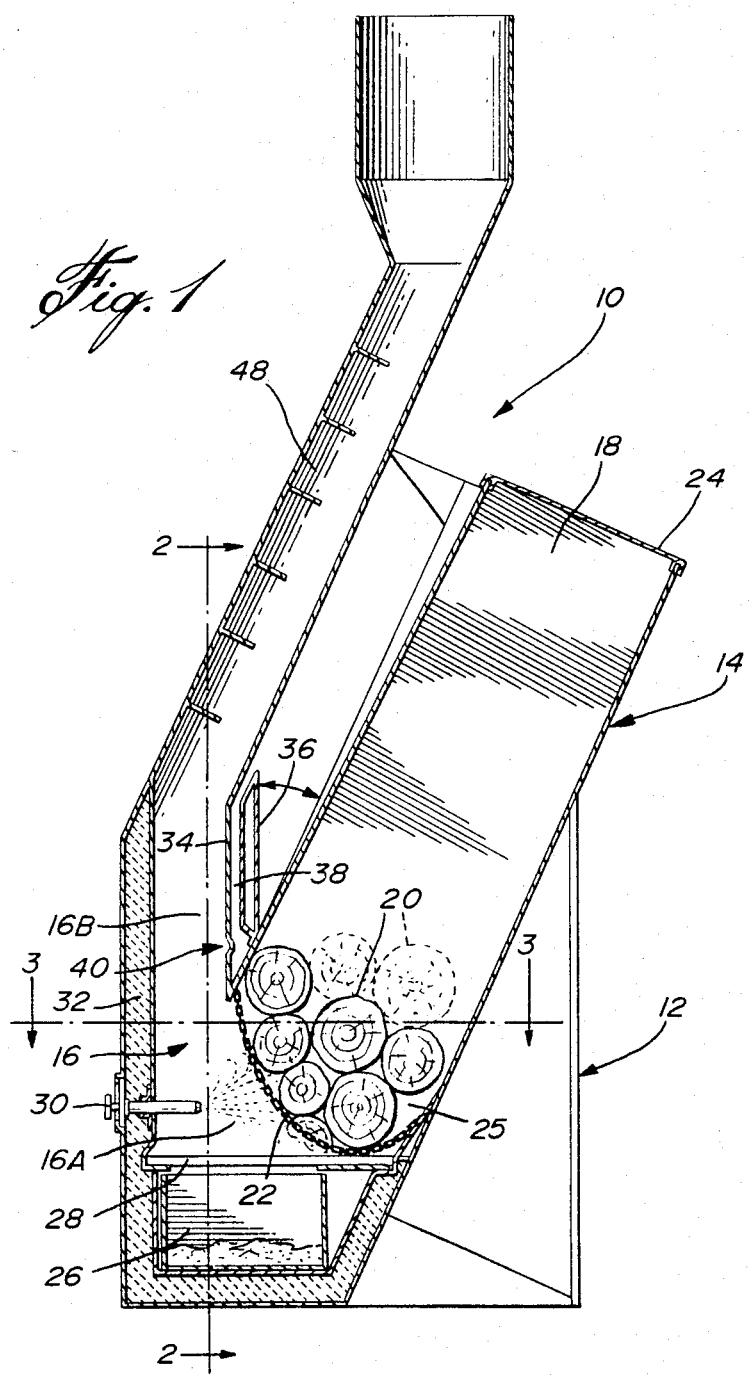

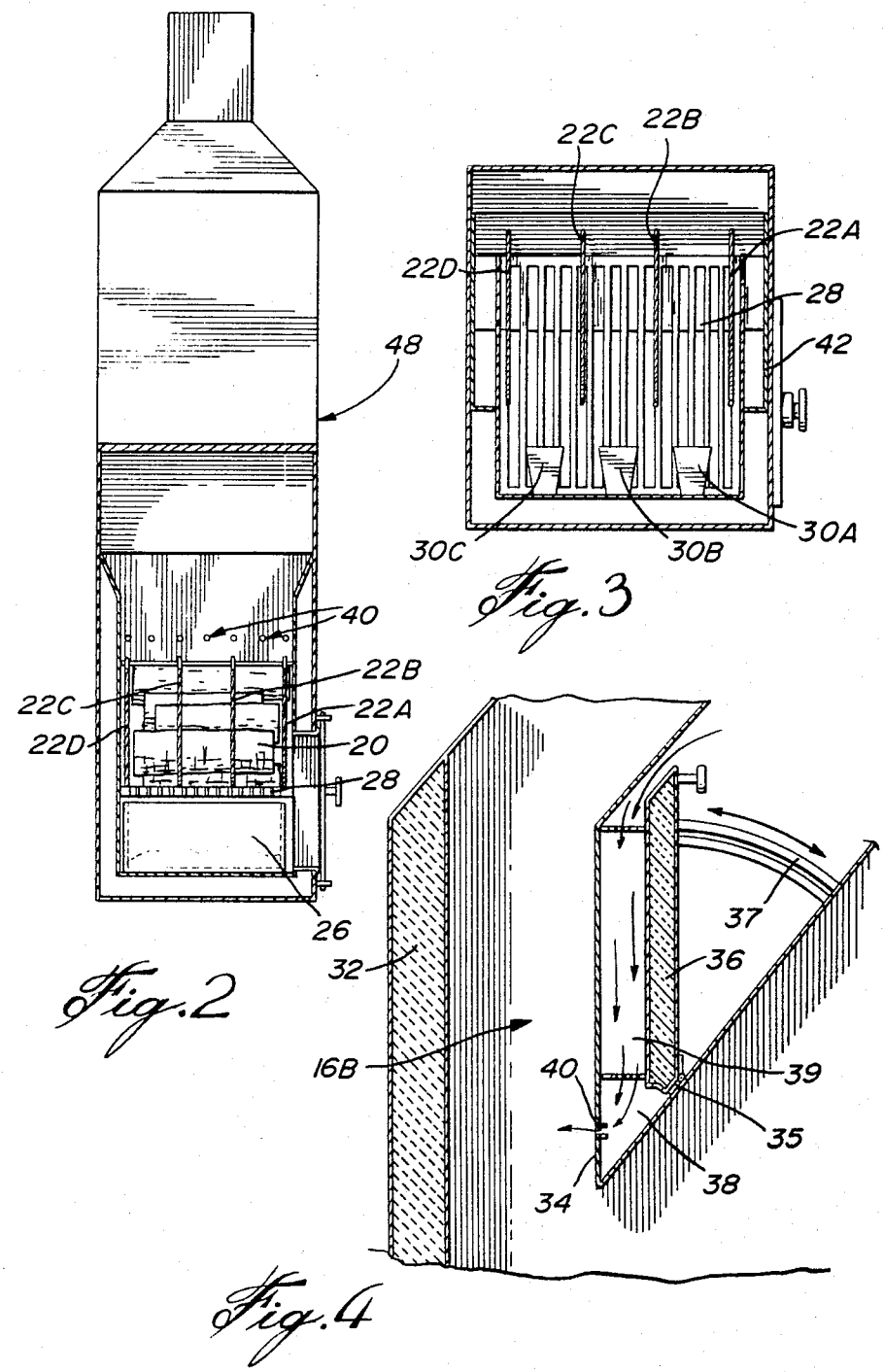

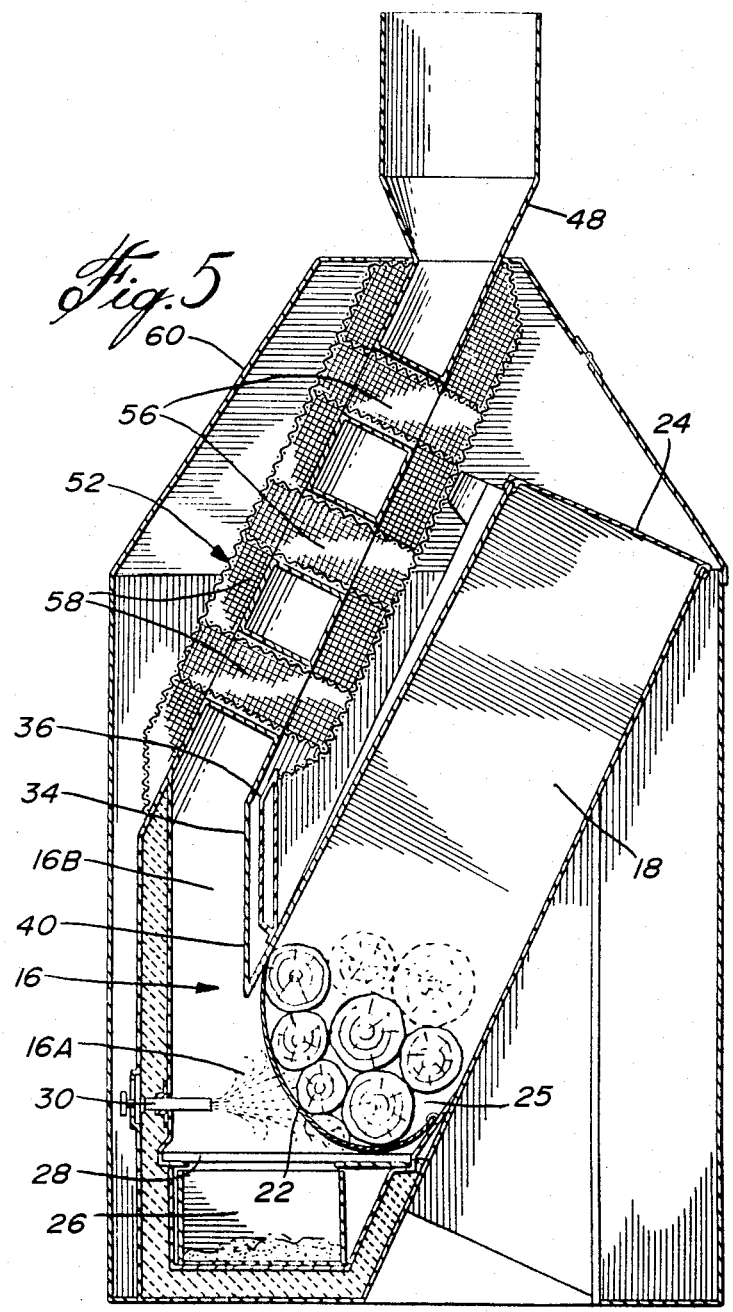

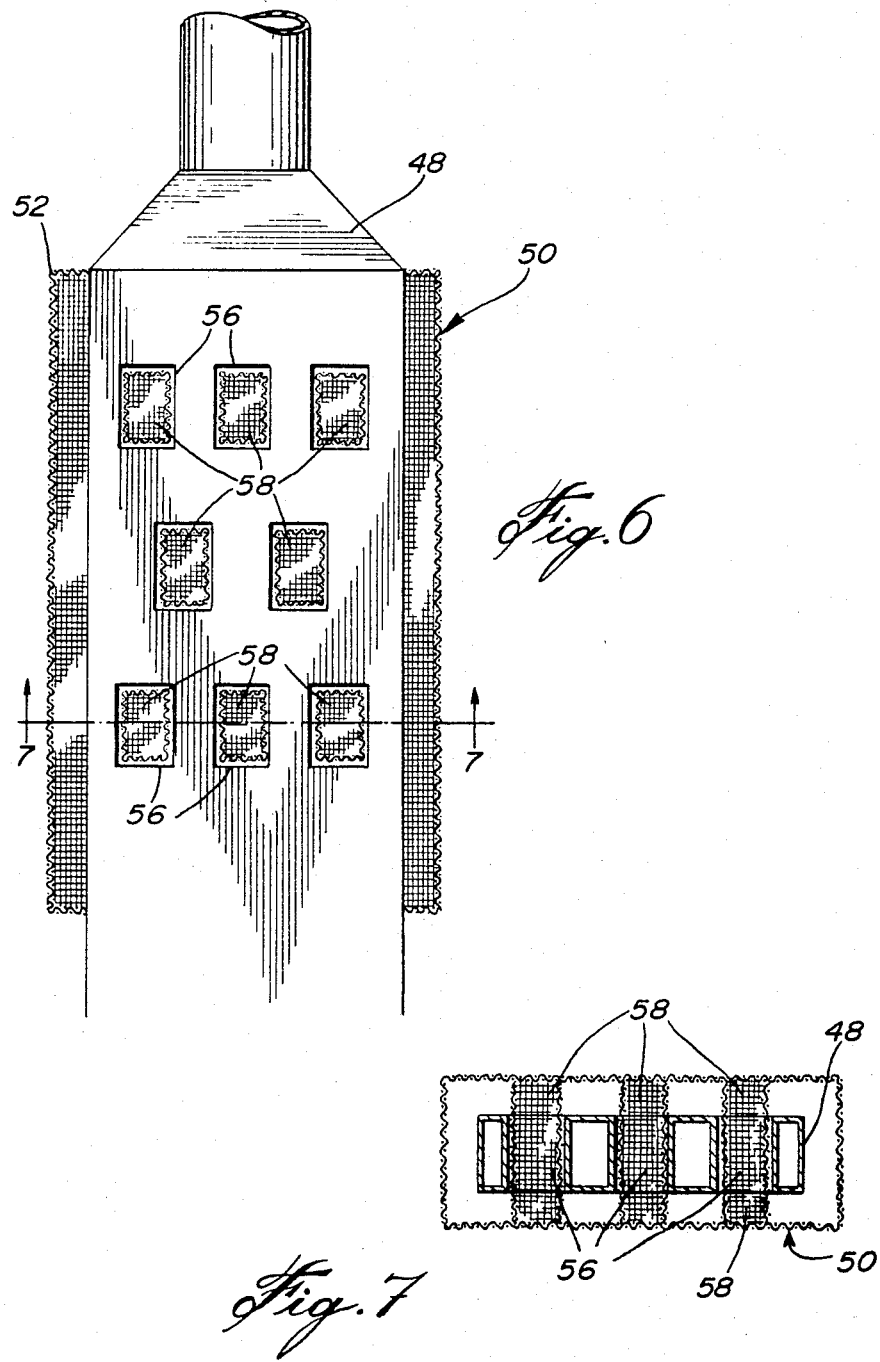

SOLID FUEL FURNACE

This is a continuation of application Ser. No. 449,644, filed Dec. 14, 1982 now abandoned.

FIELD OF THE INVENTION

The present invention pertains to a furnace for consuming solid fuel and, more particularly, to a self-stocking furnace where the solid fuel is delivered and fed to a combustion chamber.

BACKGROUND OF THE INVENTION

In cases where solid fuel is wood, it has been found that combustion in conventional furnaces encounters many problems such as short duration and irregularity of heat dissipation, formation of creosote at low operating conditions, and a certain difficulty in controlling combustion. Conventional solution in solving these problems includes the combined heating of wood, oil, gas and electricity, the accumulation of a heat reserve or automatic feeding units. However, these systems present inconveniencies such as elevated costs, the taking of large space area, insufficient combustion at low operating conditions; and, the control of combustion is still difficult to achieve. Furthermore, in the case of a heat reserve, the reaction time is still relatively long.

OBJECTS AND STATEMENT OF THE INVENTION

It is an object of the present invention to overcome the above problems. This is achieved by providing a furnace with gravitational feed means which are so constructed and arranged in combination with air injection means as to create an air circulation which forces the combustion gases to pass through a zone of high temperature while still ensuring maximum and uniform fuel combustion.

The present invention therefore relates to a furnace for consuming solid fuel which comprises: a combustion chamber; gravitational feed means including a feeding chute for feeding the solid fuel to the combustion chamber, the chute having an upper loading end and a lower feed end adjoining the combustion chamber, the feed means including a plurality of retaining elements extending across the feed end for supporting a load of solid fuel in the chute; air injection means in the combustion chamber distantly facing the feed end to thereby create a circulation which forces the combustion gases to pass through a zone of high temperature in the combustion chamber; and conduction means proximate to the combustion chamber for collecting and guiding the combustion gases from the combustion chamber.

In one form of the invention, the retaining elements consist of a series of spaced flexible elements, each element defining an arc-shaped support extending crosswise of the feed end of the chute.

In another form of the invention, the combustion chamber includes a primary compartment and a secondary compartment where each compartment is formed of an insulating refractory material, the air injection means being mounted in the primary compartment.

In another form of the invention, the secondary compartment of the combustion chamber has one wall which is heat-permeable with air admitting means for allowing secondary air in the second chamber to increase the temperature of the secondary air in the combustion gases. This enables attainment of complete combustion of the gases at a minimum combustion rate: hence, greater efficiency.

Yet, in another form of the invention, a preheating chamber is provided for the secondary air which enables efficient use of the air even in a low operating condition.

Finally, in another form of the invention, a heat exchange device is mounted in the conduction means for collecting and conducting a heat which is recuperated from the combustion gases.

Other objects, purposes and characteristics feature of the present invention will be, in part, obvious from the accompanying drawings and, in part, pointed out as the description of the invention progresses. In describing the invention in detail, reference will be made to the accompanying drawings, in which like reference characters designate corresponding parts throughout the several views. It should be understood, however, that this detailed description, while indicating preferred embodiments of the invention, is given by way of illustration only since various changes and modifications within the spirit and scope of the invention will be apparent to those skilled in the art.

IN THE DRAWINGS

FIG. 1 is a schematic elevation view of a furnace made in accordance with the present invention;

FIG. 2 is a cross-sectional view taken from line 2—2 of FIG. 1;

FIG. 3 is a cross-sectional view taken along line 3—3 of FIG. 1;

FIG. 4 is an enlarged cross-sectional view of the upper combustion compartment area of the furnace;

FIG. 5 shows a furnace made in accordance with the present invention equipped with a heat exchange unit;

FIG. 6 is a front elevation view of the heat exchange unit shown in FIG. 4; and

FIG. 7 is a cross-sectional view taken along line 7—7 of FIG. 6.

DESCRIPTION OF PREFERRED EMBODIMENTS

Referring generally to FIGS. 1-4, there is shown a furnace generally denoted 10 comprising a supporting structure 12, a fuel feeder 14, and a combustion chamber 16.

The feeder 14 consists of an inclined chute 18 in which is stacked solid fuel. In the embodiment illustrated, the solid fuel consists of wood logs 20; however, other forms of solid fuel may be used such as blocks, wood planks, paper bricks, etc. The solid fuel 20 is retained at the lower end of the chute by means of flexible retaining elements 22 which preferably consist of stainless steel cables extending crosswise of the feed end of the chute. The opposite upper end of the chute includes a door 24 so that the chute is air-tight. The wall of the chute 18 is formed of heat-permeable material. The lower part of chute 18 has a larger cross-sectional dimension than that at the upper part and the wall 25 of this lower part is formed of refractory material or of reduced metal, which condition is required since the feed end of the chute is adjacent the combustion chamber. The enlarged lower portion of the chute together with the presence of flexible supports 22 allow the fuel to descend by gravity, gradually and regularly, toward the combustion chamber. The elongated shape of the chute and the material used for its wall enable the fuel inside the chute to remain below its gasification temperature.

An ash compartment 26 over which extends a grate 28 is located beneath the combustion chamber 16.

The combustion chamber includes a lower compartment 16A and an upper compartment 16B. The lower compartment is called the primary compartment of the combustion chamber and its wall is formed of insulating refractory material. Compartment 16A includes a series of horizontally disposed air nozzles 30, three of which are shown in FIG. 3. The air nozzles are in facing arrangement with the feed end of chute 18; they serve to ensure that the combustion gases traverse the zone of high temperature in the combustion chamber. In addition to ensure controlled and uniform combustion of the fuel, the nozzles also serve to direct the combustion gases to the secondary compartment instead of forcing them in the feed chute 18.

The upper compartment 16B is also formed of a refractory wall 32 having a high thermal resistance. However, one portion 34 of this wall is made of heat-permeable material and includes a series of air admitting orifices 40. The presence of orifices in the secondary compartment accelerates the diffusion of secondary air in the combustion gases. This enables attainment of a complete combustion of the gases with a minimum of air thereby providing greater efficiency. The air admitted through the orifices 40 is preferably pre-heated in a chamber 38 which is closed by an insulated movable panel or door 36. Referring to FIG. 4, this door is hinged at 35 and its pivotal movement is guided by a slider 37 mounted to the housing of the furnace. A grid 39 is preferably mounted in chamber 38 to absorb radiant heat from compartment 16B. Pre-heating secondary air is important especially under low operating conditions; the movable panel avoids overheating of the furnace under high operating conditions. There results an efficient use of the furnace for both regimes.

Referring to FIGS. 5, 6 and 7, there is shown a furnace similar to the one illustrated in FIGS. 1–4 with the additional feature of a heat exchange device, generally denoted 50 mounted to the chimney stack 48. The heat exchange device comprises a box-like grid structure 52 surrounding the stack and a series of rectangular cylinders 56 traversing the stack. Grids 58 may extend inside the cylinder and connect to the grid structure 52. The rectangular cylinders increase the turbulence of the combustion gases near the outer walls of the exchanger, which increases the extraction of heat for a corresponding exchange surface. On the other hand, the grids used with the heat exchanger absorb the radiant heat which is retransmitted to the ambiant air. This increases the exchange surface without increasing proportionally the weight and without hindering the free circulation of the ambiant air.

The furnace may include a housing 60 in which the furnace is enclosed, the housing having an insulating wall 62 at least in the region of the heat exchange unit.

Although the invention has been described above in connection with two specific forms, it will be evident to the person skilled in the art that it may be modified and refined in various ways. It is therefore wished to have it understood that the present invention should not be limited in interpretation except by the terms of the following claims.

The embodiments of the invention in which an exclusive property or privilege is claimed are defined as follows:

1. A furnace for consuming solid fuel elements comprising:
   a combustion chamber;
   gravitational feed means including a feeding chute for feeding said solid fuel elements to said combustion chamber; said chute having an upper loading end and a lower feed end adjoining and being open to said combustion chamber; said feed means including a plurality of flexible retaining means extending across said feed end from one side thereof to an opposite side for supporting a load of solid fuel elements in said chute adjacent said feed end and permitting continuous supply of the fuel elements to the lower end of said chute;
   air injection means in said combustion chamber spaced from and being located directly opposite said feed end, said injection means injecting air in said combustion chamber toward said feed end to provide a circulation forcing combustion gases to pass through a zone of high temperature in said combustion chamber;
   conduction means proximate to said combustion chamber for collecting and guiding said combustion gases from said combustion chamber;
   said combustion chamber including a primary compartment and a secondary compartment, said primary compartment including therein said air injection means and said feed end of said feeding chute;
   said secondary compartment being located above said primary compartment, said primary and secondary compartment including walls formed of refractory material;
   said secondary compartment including a further wall formed of a heat-permeable material;
   air admitting means in said further wall for allowing secondary air in said combustion chamber;
   said furnace further comprising outside said combustion chamber, an insulated movable panel forming a chamber in proximity of said air admitting means for preheating said secondary air prior to entering said combustion chamber.

2. A furnace as defined in claim 1, wherein said retaining means consist of a series of spaced members, each defining an arc-shaped support extending crosswise of said feed end.

3. A furnace as defined in claim 2, wherein each said support is a cable formed of stainless steel with each cable having one end connected to one side of said feed end and an opposite end connected to the opposite side of said feed end.

4. A furnace as defined in claim 1, wherein said feeding chute is inclined with respect to a vertical plane; said loading end having a cross-sectional area smaller than that of said feed end.

5. A furnace as defined in claim 4, wherein said feeding chute is provided with a door at said loading end to define an air-tight heat-permeable enclosure.

6. A furnace as defined in claim 4, wherein said feeding chute includes at least adjacent said feed end an inner wall made of insulating refractory material.

7. A furnace as defined in claim 1, further comprising an ash compartment below said primary compartment and grate means between said ash compartment and said primary compartment.

8. A furnace as defined in claim 1, further comprising heat exchanging means associated with said conduction means.

9. A furnace as defined in claim 8, wherein said heat exchanging means include an elongated housing having deflector means therein.

10. A furnace as defined in claim 8, wherein said heat exchanging means include an elongated housing having rectangular conduits extending through said conduction means.

11. A furnace as defined in claim 1, wherein said combustion chamber, gravitational feed means, air injection means and conduction means are enclosed within a partially insulated housing.

12. A furnace as defined in claim 8, wherein said heat exchanging means comprise a grid-like structure surrounding said conduction means.

13. A furnace as defined in claim 10, comprising grids extending through said conduits.

* * * * *